United States Patent [19]
Bumbalough

[11] Patent Number: 5,393,938
[45] Date of Patent: Feb. 28, 1995

[54] IN-BED PATIENT SCALE
[75] Inventor: Timothy R. Bumbalough, Yorba Linda, Calif.
[73] Assignee: Bio Clinic Corporation, Ontario, Calif.
[21] Appl. No.: 98,294
[22] PCT Filed: May 6, 1993
[86] PCT No.: PCT/US93/04306
 § 371 Date: Jul. 26, 1993
 § 102(e) Date: Jul. 26, 1993
[51] Int. Cl.⁶ .................................. G01G 19/52
[52] U.S. Cl. .............................. 177/144; 5/600
[58] Field of Search ........................ 177/144; 5/600

[56] References Cited
U.S. PATENT DOCUMENTS 4,363,368 12/1982 Paddon et al. ............... 177/144
4,953,244 9/1990 Koerber, Sr. et al. ......... 177/144 X
4,961,470 10/1990 Koerber, Sr. ................. 177/144
4,974,692 12/1990 Carruth et al. ............... 177/144
5,269,388 12/1993 Reichow et al. .............. 177/144

Primary Examiner—George H. Miller, Jr.
Attorney, Agent, or Firm—Christie, Parker & Hale

[57] ABSTRACT

A scale disposable on a bed frame for measuring the weight of a person in the bed on a mattress, the scale comprising a relatively thin scale frame assembly having overall length and width dimensions related to the dimensions of the bed frame. A plurality of load cells are carried by the scale frame assembly at selected locations in the assembly, each cell producing a signal representative of the weight applied to the frame assembly in its vicinity. A scale control and display device receives the several load cell signals and produces a scale output signal indicative of the weight of a person supported on the mattress.

21 Claims, 8 Drawing Sheets

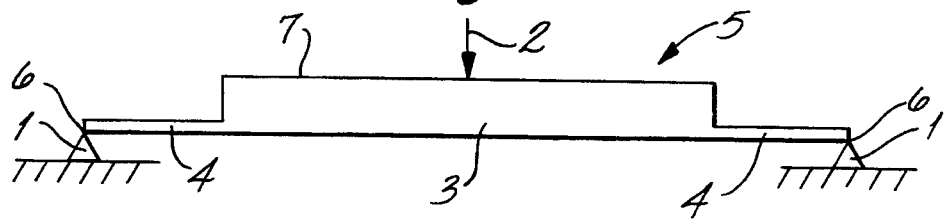
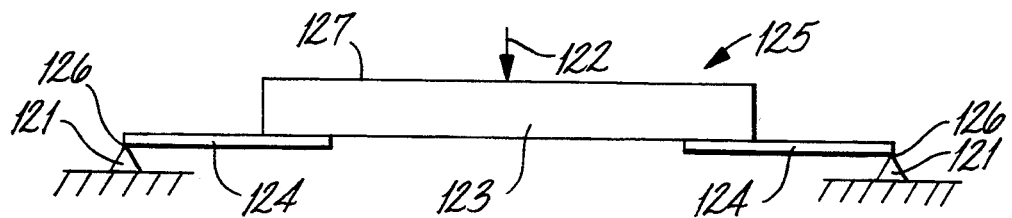
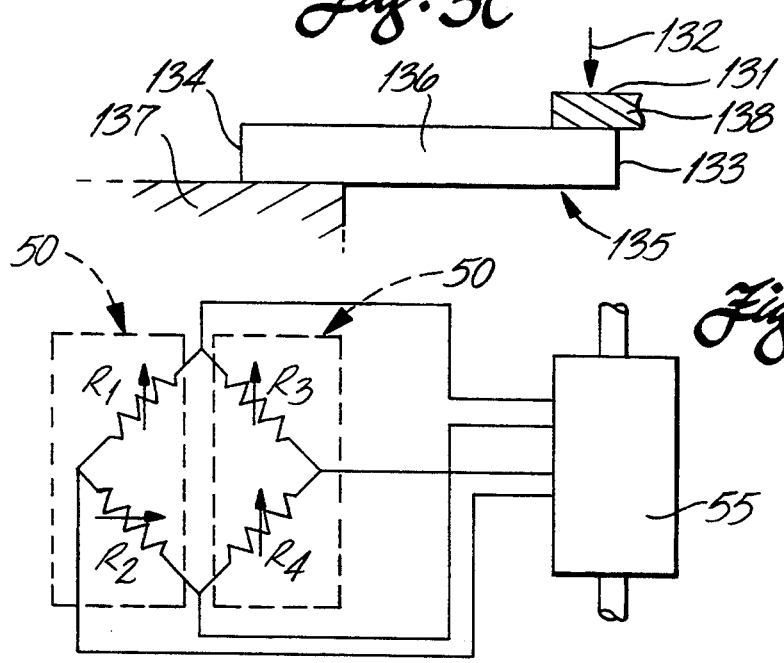
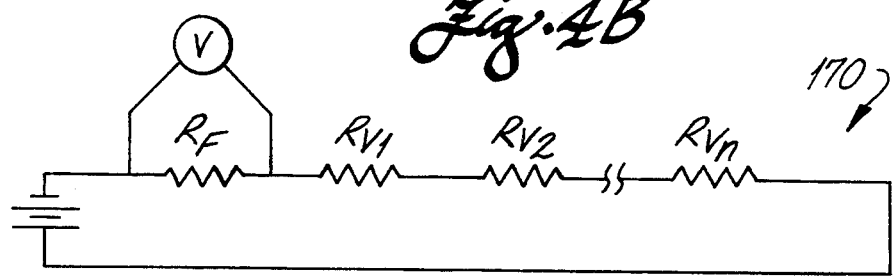

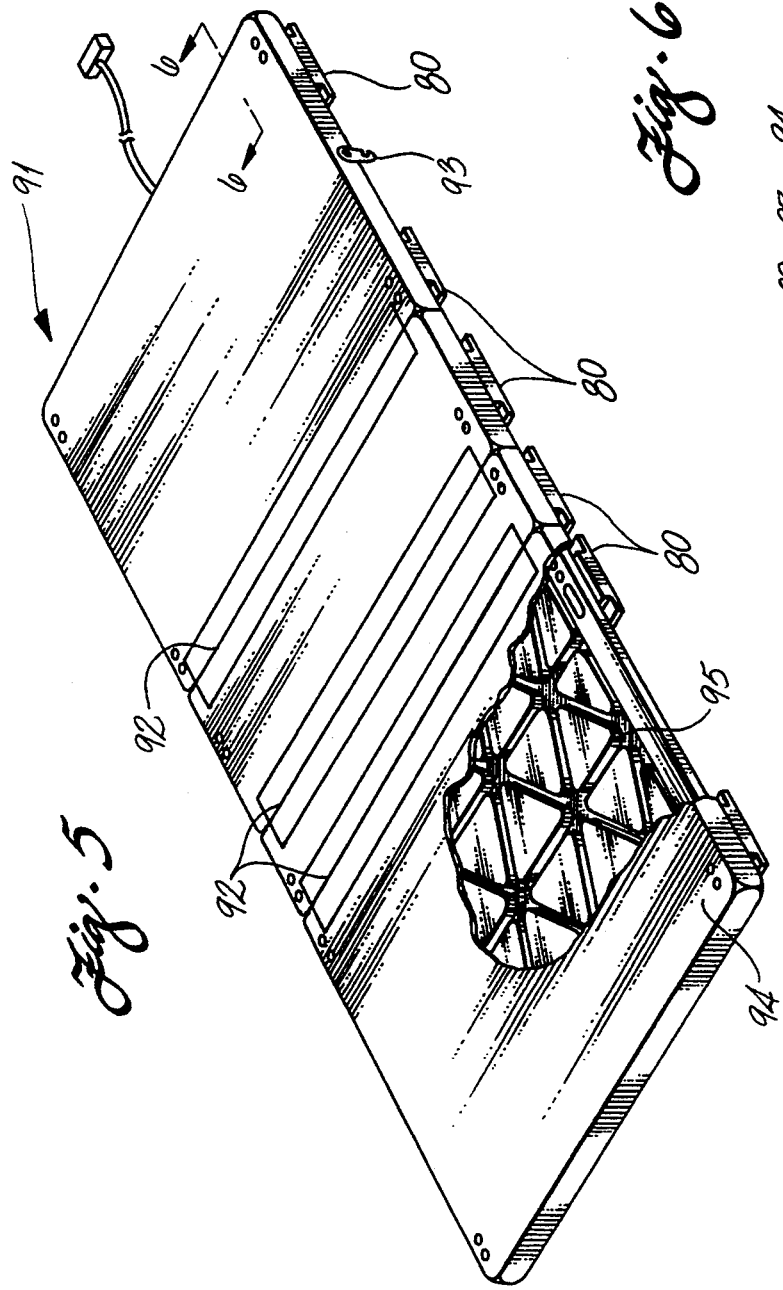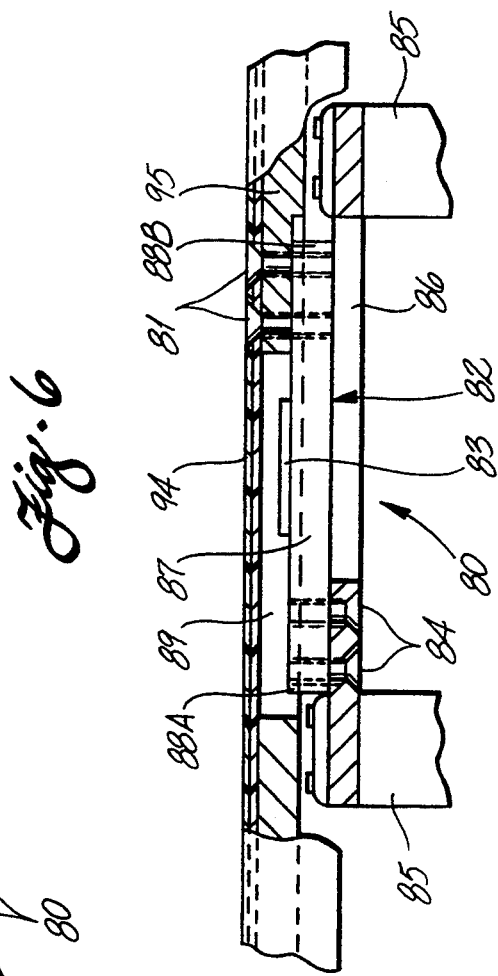

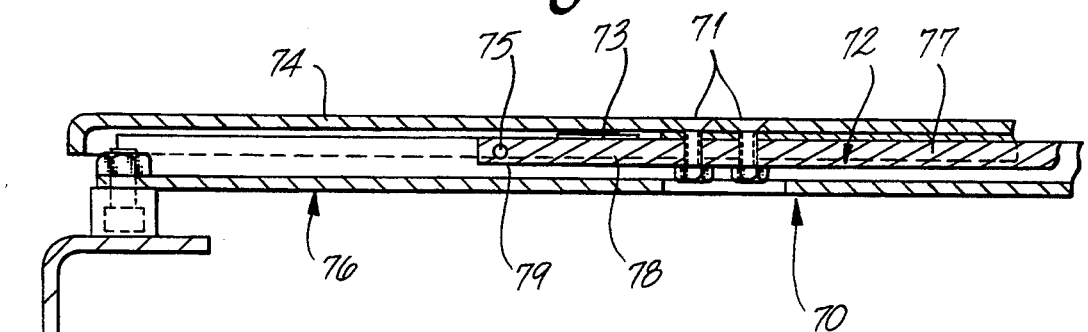
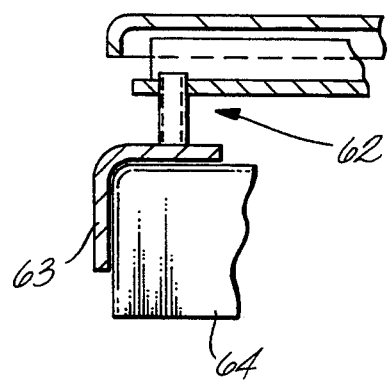
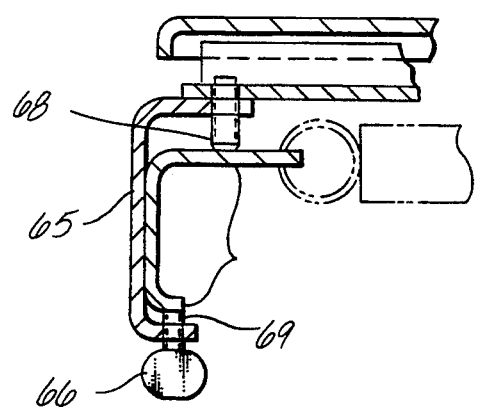
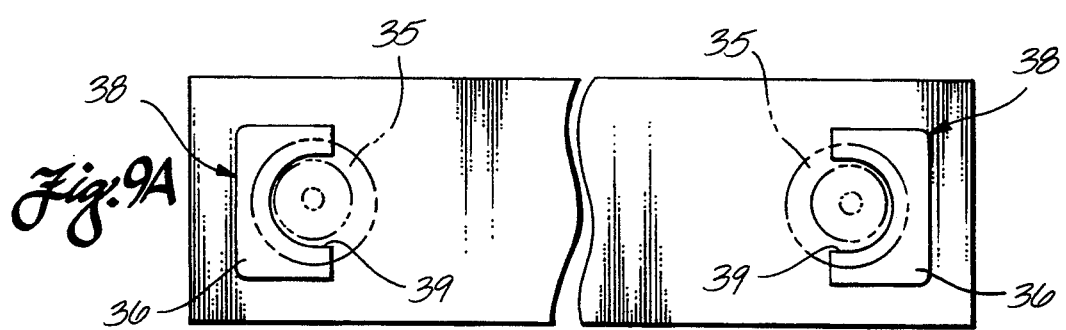
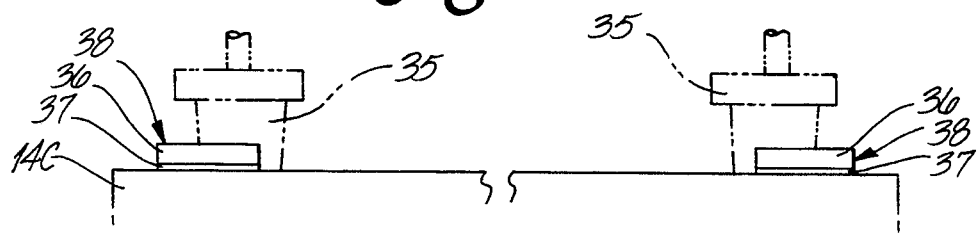

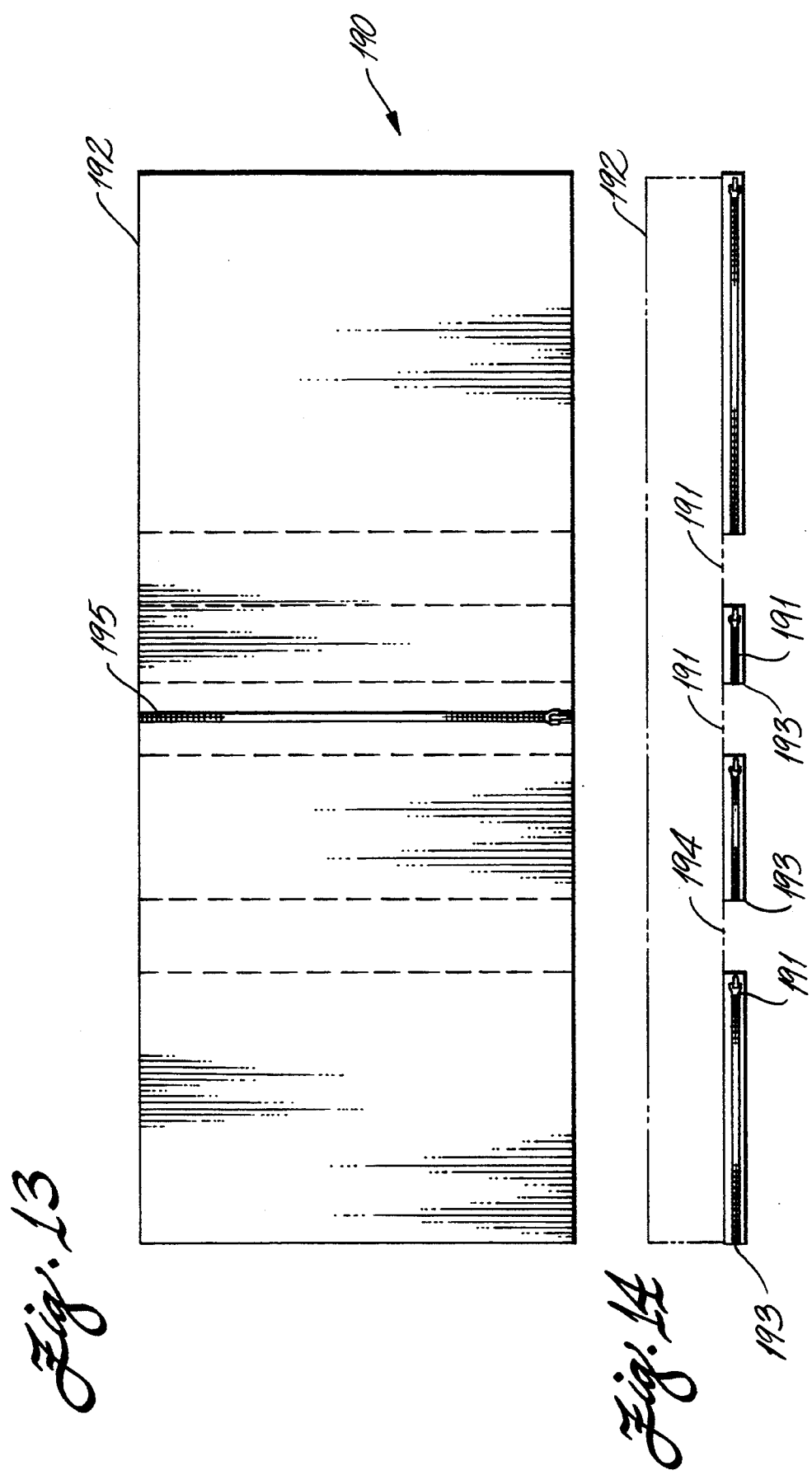

IN-BED PATIENT SCALE

FIELD OF THE INVENTION

The present invention pertains to the field of bed scales, and more particularly to a bed scale which is positionable between a bed frame and at least part of a mattress. The scale is used for weighing a person supported on the mattress.

BACKGROUND OF THE INVENTION

There are currently three types of bed scales available for use in weighing a person lying in a bed. The bed scales are either "built-in, .... under-bed," or "bedside."

"Built-in" scales are designed into the bed frame by the bed manufacturer and are usually encountered in higher priced, critical-care bed systems. They can be substantially more expensive than other types of scales, including scales according to the present invention.

"Built-In" scales inherently are unable to be transported from bed to bed. They require the purchase of an entire bed frame specially designed with the "built-in" scale installed. They are not retrofittable to existing bed frames. A patient must be in one of the specially designed "built-in" scale bed frames in order to be weighed. If not, the patient must be moved to that specific bed frame. As the study that is discussed below indicates, when a patient's weight is most desired, movement of the patient is least likely to be in the patient's best interest. Moving the patient is least desirable when the patient is critically ill, and yet this is when the patient is most likely in need of having his/her weight monitored. The relatively high expense of these scales can result in the hospital or care center being unable to afford many of such beds.

Another difficulty with "built-in" scales is that anything hanging on the bed frame can cause error in most of the weighing systems. The error is caused when the scale is initially zeroed out and then items such as urine bags (Folley bags), drug pumps, CPR equipment and the like are hung on the bed frame. The equipment weight causes the scale to include this in the patient's weight, resulting in an incorrect reading of weight. A scale according to the present invention can be independent of both the mattress and the frame of the bed. Therefore, anything hanging on the frame of the bed will not affect the scale or its reading of the patient's weight.

The "under-bed" scales are designed as a ramp for the bed to be rolled onto. The "under-bed" scales can provide continuous monitoring of the total combined weights of the bed, bedding, and patient. These scales typically come as two part systems. One section is used at the head of the bed while the second section is used at the foot of the bed. The installation of these scale systems requires proper ramp placement and alignment so that each of the four bed wheels can be rolled onto the weighing platforms in unison and thereafter be properly positioned on the weighing mechanisms.

These "under-bed" scales are not conveniently transportable, and they are expensive. These "under-bed" scales are relatively difficult to maintain, and often require specially trained personnel to operate them. If these scales are ever moved for use with another bed, they usually require re-calibration by specially trained personnel. Therefore, "under-bed" scales are often both difficult and expensive to install and to maintain.

Finally, there are two types of "bedside" scales. The first type is known alternately as a sling, hammock, or stretcher scale. This scale consists of a canvas type material that is slipped under the patient in the manner of a stretcher. The canvas is then attached to an overhead hoist which lifts the patient from the bed for weighing. The second type of "bedside" scale, sometimes referred to as a litter scale, operates similarly. However, instead of having a canvas sling, this type of scale has a rigid board which lies parallel to the bed, requiring patient transfer before and after weighing.

The need for accurate monitoring of fluctuations in patient body weight has become increasingly important to the medical community in recent years. This fact is being continually reinforced through comments by clinicians, nurses, and in scientific journals. Doctors must constantly tailor medications and specialty treatments according to a patient's weight or weight change. This type of customized health care is essential to providing safe and effective wound or disease management and prevention. One study in the *New England Journal of Medicine* describes a desire by medical personnel to observe a patient's weight within plus or minus one pound. For the complete text, see Kay Schlegel-Pratt & William D. Heizer, *How Accurate are Hospital Scales?*, 320 NEW ENG. J. MED. 189 (Jan. 19, 1989).

Another study, in the *Journal of Parenteral and Enteral Nutrition,* states that "[d]eterminations of body weight are important in most hospitalized patients and especially in those individuals receiving nutritional support to monitor fluid balance and to measure nutritional therapeutic efficacy. Actual tissue gains and losses of greater than 0.5 pounds/day are almost impossible. Weight changes greater than this reflect changes in total body water, a clinically relevant fact with therapeutic implications." For the complete text, see Peggi A. Guenter, et al., *Body Weight Measurement of Patients Receiving Nutritional Support,* J. PARENTERAL AND ENTERAL NUTRITION 441–43 (1982). Part of the Guenter study included eliciting "what factors the nurses felt needed to be changed in order to improve obtainment of weights." One of the three most important items that the nurses felt could be changed to increase weight measurement was "scales broken or unreliable." In addition, a number of nurses expressed a concern which was "focused on equipment problems such as litter scales being unavailable, broken, too cumbersome or uncomfortable for the patient."

Other reasons for not obtaining patient weights included "patient refuses" and "nursing staffing shortages." The article postulated that "Patient cooperation may increase if they are not awakened . . . [and required to be moved] to be weighed." The patients were required to either get out of bed and use a standup scale or had to be moved in order to use a litter scale. In use of the present invention, there is no need to move the patient or to require the patient to get out of bed to use a standup scale. Also, it does not require extensive use of nursing staff. The medical personnel need only briefly look at the scale readout unit and note the weight on the patient's chart. Medical personnel do not have to move or wake up the patient.

The Guenter article also stated that "[m]easurements of height and weight are considered by some to be indicators of nutritional status. Serial weight measurements are clinically useful in determining a patient's fluid status and therefore in monitoring the nutritional regimen." The study then examined the likelihood that a patient would have their weight monitored regularly. The weights were least often-obtained for patients that were the most critically ill. However, even though the importance of weight measurement was expressed to the medical personnel, the "[l]ack of weights clustered in the intensive care units with patients in whom weight obtainment may be most clinically useful." The weights of intensive care patients were often not obtained, even though weight measurement was required for these patients.

The two reasons most often cited for not obtaining patient weight by the nursing staff were "patient too critically ill" and "other priorities of care exist." Both of these reasons exist primarily because the existing technology that is economically viable usually requires movement of the patient to a scale unit. "Almost by definition, if a patient were in an intensive care unit, he/she was too sick to be weighed by either the conventional standing or the litter scale method."

Problems in weight monitoring arise, as indicated above, including when a 100-pound nurse is confronted with moving a 200-pound bedridden patient to a scale. It is seen, therefore, that a need exists for simple, reliable, effective and relatively low cost equipment. This equipment should be able to be installed conveniently in an existing hospital bed for weighing a patient supported by the bed.

SUMMARY OF THE INVENTION

This invention addresses the need which has been identified above. It does so by providing an effective, efficient, reliable, and easily usable scale assembly which can be supported on a bed frame either under a mattress or as a bottom pan of a scale and mattress combination. The scale assembly is useful to accurately weigh a patient lying or otherwise supported on the mattress and to display information descriptive of the weight of the patient.

The assembly can be constructed so that it is portable for ready transfer between existing bed frames. It is readily mountable on a range of bed frames and, when so mounted, does not detract from the comfort of a patient using the bed. The scale assembly preferably is comprised of a plurality of separate weighing units. These weighing units are so sized and interrelated that the assembly can be used on an articulated hospital bed frame without interference with the articulatability of the bed frame. The scale assembly also provides useful information about the weight of a patient in such a bed. The scale assembly is readily and efficiently useable, without extensive special training, by health care personnel of differing skills and backgrounds.

Generally speaking, according to one of its aspects, the invention provides a scale system for measuring the weight of a person supported on a bed frame. The scale comprises a load assembly which is mountable on a bed frame between the frame and a mattress. The load assembly has length and width dimensions which are related to the length and width dimensions of the bed frame. The load assembly is comprised of at least one load receiver which preferably is substantially planar and substantially rigid. The load assembly has a height dimension which is small relative to its width and length so that, when placed between a bed frame and a mattress, it does not appreciably raise the mattress above the frame. The scale also includes a plurality of load sensors which are disposed at selected locations in the load assembly. Each load sensor has an output signal which is representative of the load carried by the load assembly in the vicinity of the sensor. The scale also includes a system output device which operates to receive the several sensor output signals and to produce a system output signal which is representative of the total load carried by the load assembly.

BRIEF DESCRIPTION OF THE DRAWINGS

The above-mentioned and other features and characteristics of this invention are more fully set forth in the following description of the presently preferred and other forms and embodiments of the invention, which description is presented with reference to the accompanying drawings wherein:

FIG. 3A is a free-body diagram representative of a load sensitive beam element which is a component of the scale unit shown in FIG. 2;

FIG. 3B is a free-body diagram of an alternate load sensitive beam element of the style shown in FIG. 7;

FIG. 3C is a free-body diagram of another load sensitive beam arrangement of the style shown in FIGS. 5 and 6;

FIG. 4A is a simplified electrical schematic diagram illustrative of the electrical circuitry of a scale unit of the kind shown in FIG. 2;

FIG. 4B is a simplified electrical schematic diagram for the complete scale system shown in FIG. 1;

FIG. 5 is perspective view of another scale load assembly according to the present invention;

FIG. 6 is an enlarged fragmentary cross-section view taken along line 6—6 in FIG. 5;

FIG. 7 is a fragmentary cross-sectional side elevation view of another embodiment of a load sensitive beam element and attachment arrangement according to the present invention;

FIGS. 8A and 8B are fragmentary cross-sectional side elevation views of further mounting arrangements useful in the practice of the present invention;

FIG. 9A is a top plan view of the presently preferred arrangement for mounting a scale assembly to a bed frame in the practice of the present invention;

FIG. 9B is a fragmentary side view of the mounting arrangement shown in FIG. 9A;

FIG. 13 is a top plan view of a mattress and scale set according to this invention;

FIG. 14 is a side elevation view of the mattress/scale set shown in FIG. 13.

DETAILED DESCRIPTION

Figure 1:
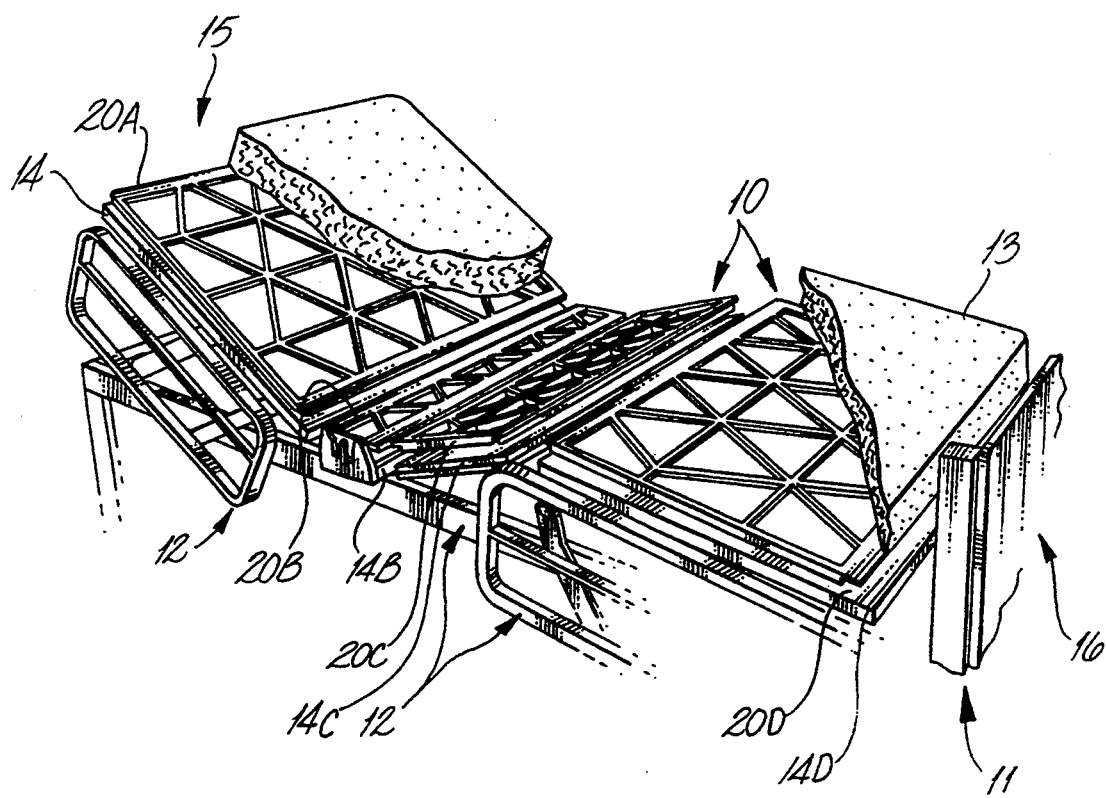
FIG. 1 is a perspective view, with certain parts broken away, of an articulated bed of the kind commonly used in hospitals and other health care facilities, on the frame of which are disposed four scale load receiver units according to a presently preferred embodiment of the present invention.

As shown in FIG. 1, this invention provides a portable in-bed patient scale system 10 which includes a load assembly that preferably is composed of a plurality of cooperating scale load receiver units 20A–20D. The scale 10 can be placed on a horizontal articulated frame 12 of a hospital bed 11. The scale 10 is configured to be located between the bed frame 12 and a mattress 13 on which a patient to be weighed can be and preferably is supported. The scale load assembly can remain in place in the bed 11, under the mattress 13, as long as necessary. The patient normally is unaware of the presence of the scale in the bed. This is because the scale's presence has no effect upon the comfort of the patient, and because of the very low profile of the scale 10 under the mattress. The mattress can be a conventional mattress as shown in FIG. 1, or it can be an air flotation mattress system of the kind described in PCT International Publication No. WO 92/07541, or it can be some other pneumatic mattress arrangement or pressure management laying surface. Further, as shown in FIG. 13, a scale load assembly can be incorporated into a mattress envelope, if desired.

A common form of articulated hospital bed has a horizontal frame comprised of four load receiver sections 14A–D serially hinged together. The presently preferred in-bed scale 10 is comprised of four load receiver units 20A–D that can be placed atop the respective bed frame sections 14A–D and under a mattress 13. The several scale units 20A–D substantially cover the horizontal area of the respective bed frame sections 14A–D. Because the scale units 20A–D are physically separate from each other, except for flexible electrical interconnections, the load assembly of scale 10 follows and does not interfere with the articulation of the bed frame sections 14A–D.

Figure 2:
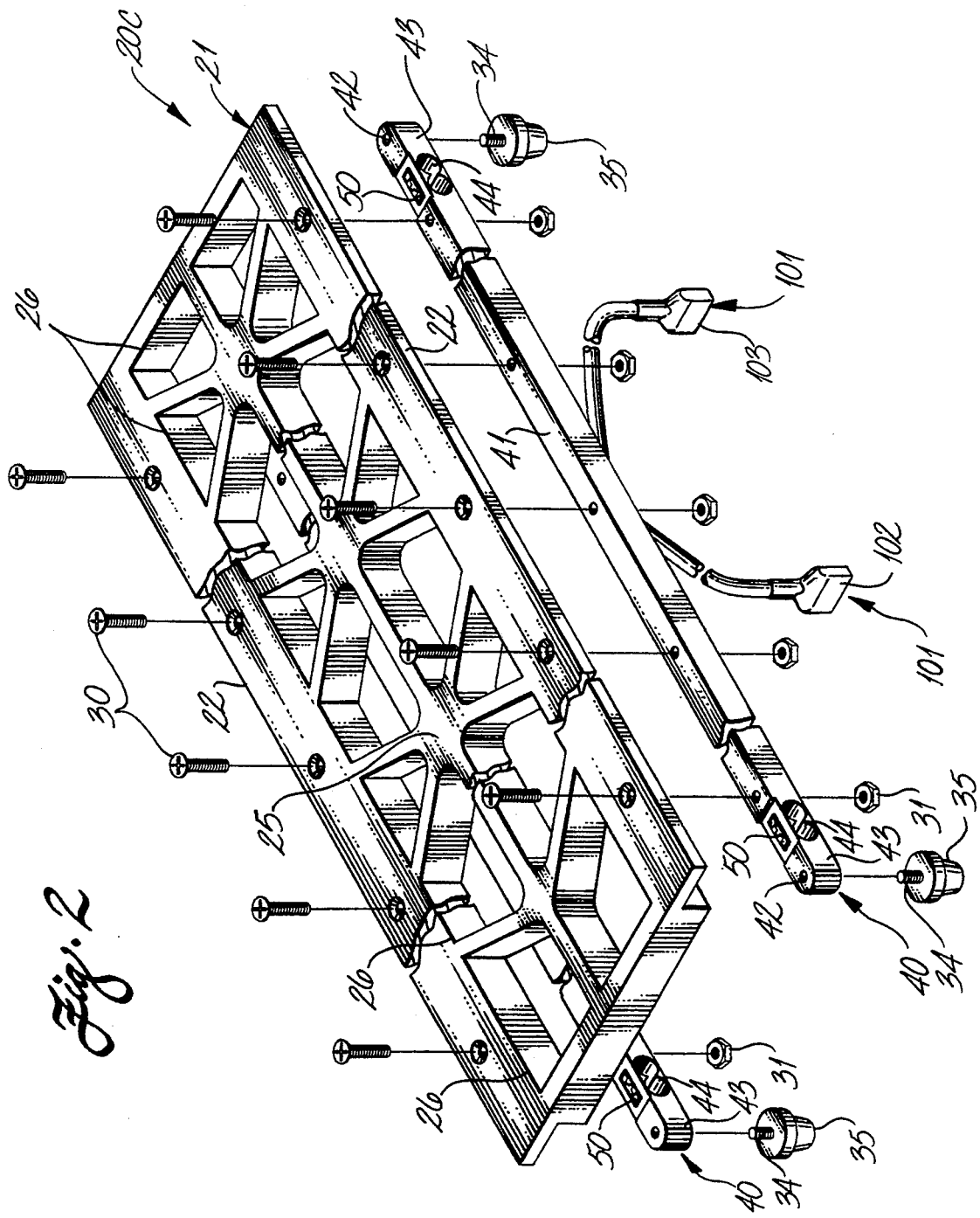
FIG. 2 is an exploded perspective view of one individual scale load receiver unit shown in FIG. 1.
Figure 10:
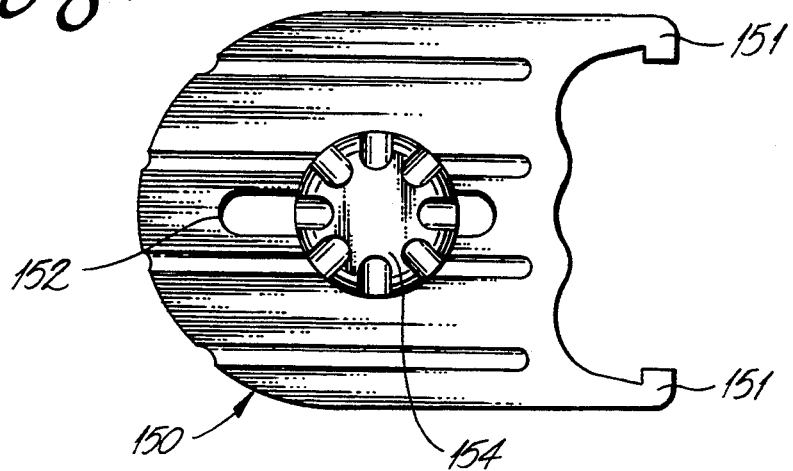
FIG. 10 is a top plan view of a clamping bracket useful for mounting a scale control and display module for the presently preferred scale system.

All four scale units 20A–D, as shown in FIG. 1, are structurally and functionally similar to each other. However, each scale unit's preferably planar and rigid structure 21 has a length defined to substantially match its respective articulatable bed frame section 14A–D. FIG. 2 shows scale unit 20C that corresponds to articulated bed frame section 14C as shown in FIG. 1. Because the scale units 20A–D are structurally and functionally similar, only one load receiver unit need be shown and described in detail. It will be understood that there are similar, if not identical, devices and circuitry, as described below, provided in the other three scale units 20A, 20B, 20D. However, the lengths of the rigid structures 21 of those other load receiver units vary to correspond to the length of the respective articulated bed frame sections.

Each scale unit 20A–D is a generally flat rectangular construction which preferably is about one and one-quarter inch high when supported by the rubber support feet 35. One rubber foot 35 is located approximately as shown in FIG. 2, at each of the four corners of each of the scale units 20A–D. Each rubber foot 35 is vertically adjustable in the unit via the threaded post 34 that is threadably engaged with a beam end 42. For example, the rubber foot is adjusted by screwing it in or out of the beam end for height adjustment to eliminate rocking on an uneven bed frame. Each of the scale units 20A–D have length (along the bed from end to end, as in "head" 15 to "foot" 16) and width (across the bed, from side to side) dimensions chosen with reference to the length and width of a corresponding bed frame section 14A–D.

Lightening holes 26 are provided which preferably form a lightening hole pattern 25 in the load receiver 20A–D. These lightening holes 26 allow for a high strength-to-weight ratio for the scale units. It will be understood that the different length units 20A–D will have their respective pattern of lightening holes modified as compared to the lightening hole pattern 25 in FIG. 2. The other units 20A, 20B, 20D will have more, less, or the same number of lightening holes as shown in FIG. 2, dependent upon the length of each unit.

The lightening hole pattern 25 is defined, as by machining or casting, in the preferably aluminum scale unit platforms 21. These lightening holes cause each platform to be substantially rigid and of low mass as compared to similar structures without lightening holes. The load sensitive beams 40 are also made as low in mass as practicable.

Even with the lightening holes 26, the platform structures 21 are substantially rigid as compared to the transverse cross-sectional areas 44 of each beam 40 shown in FIG. 2. This rigidity is required in order to transmit the applied load of the patient on the scale load receiver to the load sensors 50. The load is transmitted from the top, or mattress, surface of the platform 21 to the beam flexure zones 44 via the beam's center rigid portion 41. If the scale platform 21 and the beam's center rigid portion 41 were not adequately rigid, then the sensors 50 would not adequately sense the deflection caused by the load. By not adequately sensing the deflection, the scale's accuracy of patient weight would deteriorate from the presently preferred accuracy. Presently, the scale provides the desired accuracy if constructed in the preferred manner. Of course, though not presently preferred, a greater accuracy can be achieved if the scale's relatively rigid components are constructed to be more rigid.

As shown in FIG. 2, scale unit 20C includes a rigid load-receiving platform 21, a pair of load sensitive beams 40 disposed respectively along each cross-bed edge 22 of the platform, and rubber feet 35 or other support devices at each corner of the platform 21. The rubber feet 35 are used for mounting the scale unit 20C releasably to a hospital bed frame unit and for supporting the adjacent end 42 of a load sensitive beam 40. Each beam 40 is supported at its end 42 in a manner approximating the end supports of a simply supported beam as shown in FIG. 3A.

Figure 11:
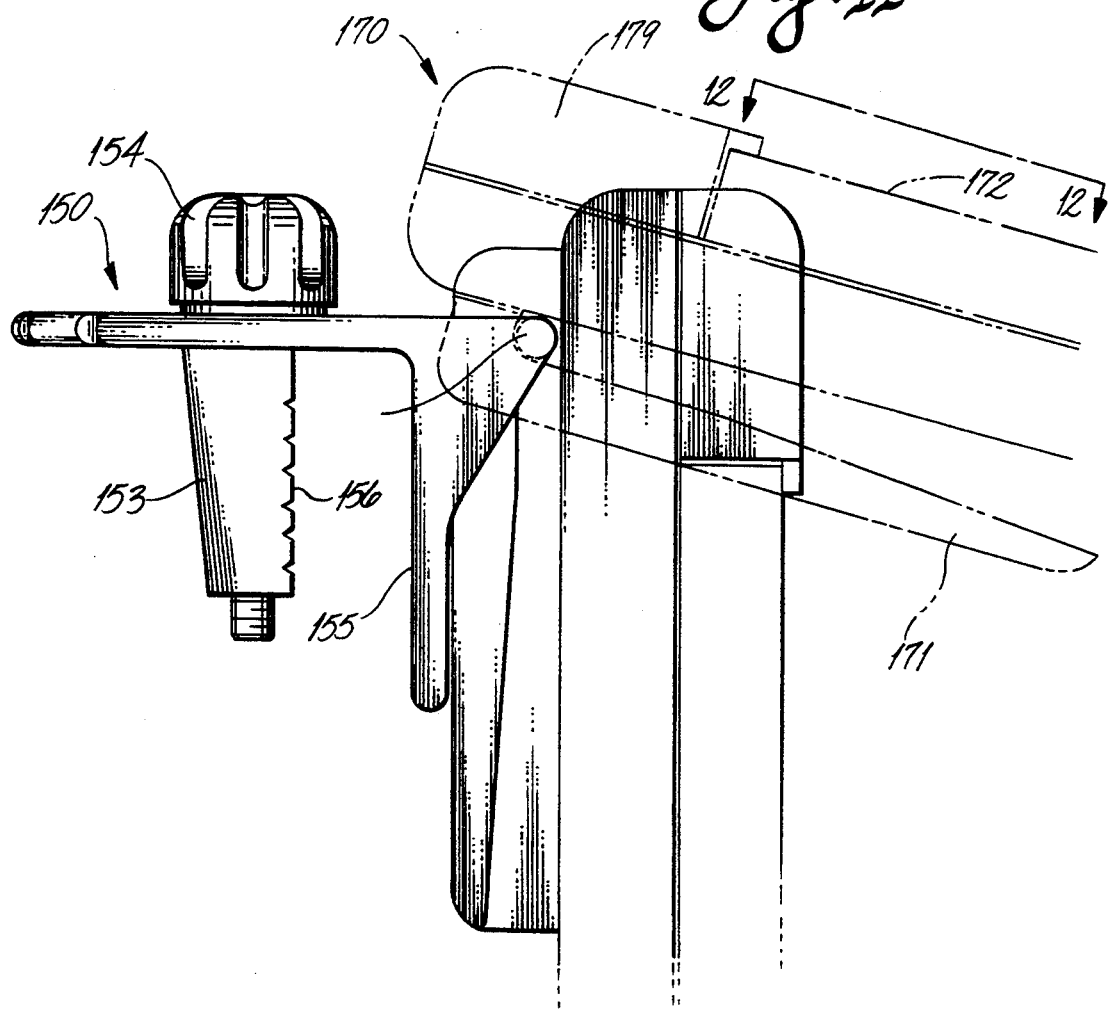
FIG. 11 is a side elevation view of a control and display module and the clamping bracket showing the movability of the module in the bracket.
Figure 12:
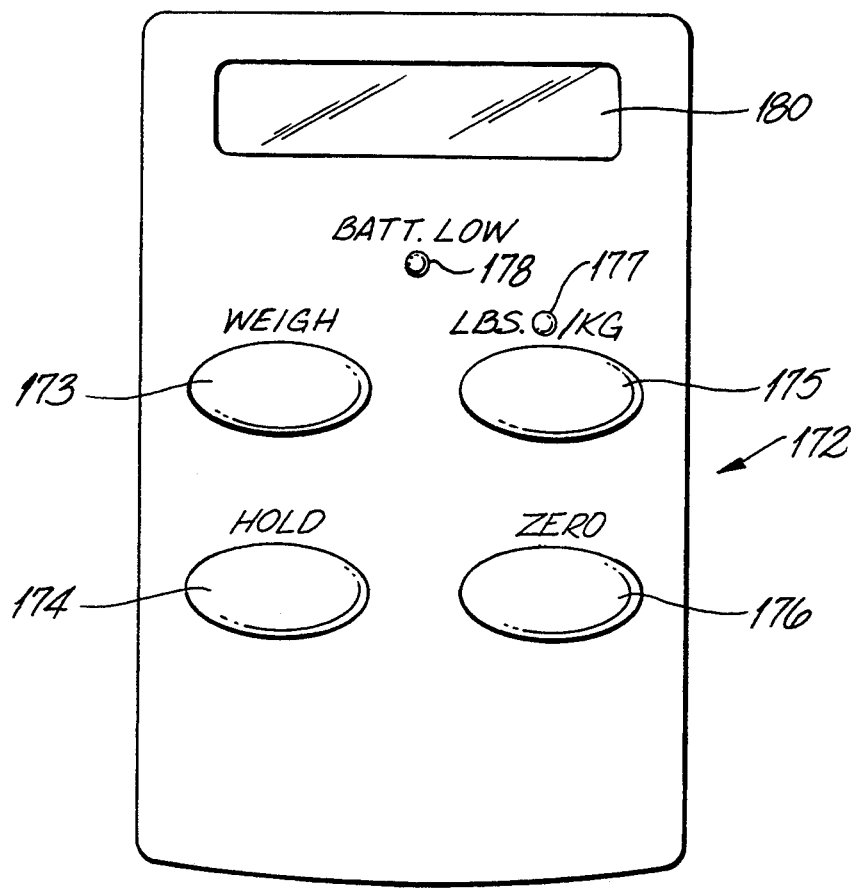
FIG. 12 is a view of the operator input key pad portion of the control and display module shown in FIG. 11.

FIG. 3A shows a simply supported representational beam 5. This representational beam 5 is the functional equivalent of a beam 40. The beam 5 is supported at its respective ends 6 by the simple end supports 1. The beam 5 has a relatively large central cross-sectional area 3 that is transverse to the beam. The large cross-sectional area 3 is nearer to the linear midpoint between the beam's ends, i.e., the beam's center, as compared to the location of the relatively small cross-sectional area 4 that is transverse to the beam nearer the beam's ends. A force 2, representing the mass of the object to be weighed by the scale 10 as shown in FIG. 1, is applied as shown in FIG. 3A to the top surface 7 of the representational beam. The force 2 is the functional equivalent of the patient to be weighed by the current invention. The relatively large cross-section area 3 substantially transmits, without significant flexing, the applied force 2 to the relatively small cross-section area 4 of the beam 5. At the relatively small cross-section 4, the transmitted force causes the small cross-section to flex. Thus, each beam end portion 4 defines a flexure zone of beam 5. Flexing (deflection) of the beam is a result of strain, i.e., relative elongation, in the beam, and that deflection is concentrated in the small cross-sectional area 4. Suitably mounted sensors are collocated in the vicinity of the small cross-section 4 to sense this strain. The strain measurement is then converted by a control and display module 170, as shown in FIGS. 11-12 and described below, into a representation of patient weight.

Each scale load receiver unit 20A-D can be viewed overall as a single load cell, or load sensor, for sensing the weight carried by it and for generating a signal having a value indicative of that weight. Alternatively, each scale unit can be viewed as a group of individual load cells, or load sensors. These individual load cells are so distributed throughout the unit that together they sense the weight carried by the unit. The individual load cells generate plural signals that together are indicative of that weight. In the following description, the term "load cell," or "load sensor," is used in both senses, with the context of use making it apparent in which sense the term is used.

Each load sensitive beam 40, over a major central portion 41 of its length, is fixedly, yet releasably, attached (e.g., by screws 30, nuts 31, and shims) to the scale unit platform 21. Relatively short end portions 43 of the beams 40 are unconnected to the platform 21 and extend to the adjacent rubber feet 35 to which the ends 42 of the beam are connected. The beams 40 can be pinned, hinged, hung, screwed, or otherwise affixed to the support devices that, in scale 10, are rubber feet 35.

As shown in FIG. 2, deflection occurs in the end portions 43 of the beams 40 in response to the loads applied to the platform. Each beam end portion 43 preferably has a section, as at 44, of beam from which material has been removed. The material is removed such that the beam's cross-sectional area, that is transverse to the beam, is substantially less than the transverse cross-sectional area of the beam 40 at other places along its length. In another arrangement, this reduced transverse cross-sectional area 43 can be a wasp-waist contour in plan view. The purpose of this reduced transverse cross-sectional area 43 is to concentrate stresses and deflections (strain) in that part of the beam length that functions to increase the stress/deflection sensitivity of the beam. That part of the beam which is strain sensitive constitutes a beam flexure zone. A load sensor 50, preferably a bonded strain gage, is suitably mounted to the beam end portion 43 at its section 44 of reduced cross-sectional area. The sensor is mounted in a manner and place selected to be most responsive to strain in the beam end portion. Thus, each beam end portion is, in effect, a sensitive load cell.

Preferably, there is one pair of load sensors 50 on each beam, with each scale unit 20A-D comprised of two beams, resulting in a total of 8 pairs of load sensors in scale 10. Preferably, each beam's pair of load sensors are interconnected with the other beams such that, overall, each beam behaves as a single variable resistor. The resistances of the several beams are effectively connected in series in the overall scale.

Preferably, each beam is composed of two load sensors 50, with one mounted near each end of a beam as shown in FIG. 2. At one end of a beam, each load sensor 50 defines a pair of strain sensitive resistors. One sensor 50 at one end of the beam defines variable resistors R1 and R2, and the sensor at the other and of the beam defines variable resistors R3 and R4. Resistors R1-R4 are interconnected in a relation as shown in FIG. 4A. As shown in FIG. 4A, resistors R1-R4 are arranged to define a bridge circuit 51 which itself behaves as a variable resistance. The output of the bridge circuit is a signal representative of the total load carried by the relevant beam 40.

It will be understood that the strain sensitive resistors R1-R4 are substantially similar. The strain sensitive resistors essentially vary only in their relative orientation of mounting to the beam. For example, one beam end's strain sensitive resistors R1, R2 could be mounted 180 degrees in rotation relative to the other beam end's strain sensitive resistors R3, R4. This rotation is in the mathematical plane sense comprised of the top plan view of FIG. 2. The resistors R1-R4 of each beam are interconnected with the scale's wire cabling set 101 of FIG. 2, that is composed of a six wire circuit as is described below. Therefore, FIG. 4A is representative, in the electrical sense, of preferably one beam in the practice of this invention.

Each Wheatstone bridge circuit 51 has a connection 55 with the scale system cabling. This cabling provides the communication path for sensor information to and from the control and display module 170.

The scale system's approximate electrical schematic functional representation is shown in FIG. 4B, where each beam is represented as one variable resistor. Essentially, the scale system provides a series connection of variable resistance values RV1-RVn and a fixed resistance value RF. The current invention can be represented as composed schematically of eight variable resistors, i.e., the beams, and an equivalent fixed resistance RF that may be collocated with a control and display module 170 that is described below. Essentially, the voltage V is measured across an equivalent fixed resistance value RF. The voltage measurement is then converted by a control and display module, using software that is also described below, into the weight of the patient. As shown in FIG. 4B, the sum of the variable resistances provided by the several beams is indicative of the patient's weight. It will also be understood that the entire scale system can be viewed essentially as only one variable resistance. This variable resistance, which is interpreted by the control and display module, is representative of patient weight.

Preferably, the connection of the control and display module to the scale load sensors is accomplished by using a six wire circuit. The six wire circuit functions on substantially the same principles as a "Kreuzer Circuit" and "Extended Kreuzer Circuit." The details of this circuitry can be found and are more fully described in KARL, HOFFMANN, AN INTRODUCTION TO MEASUREMENTS USING STRAIN GAGES 193-97 (1989). Also, preferably the scale units and the control and display circuitry are temperature stabilized and compensated using the six wire circuit, so that ambient temperature changes have little or no effect upon scale measurement accuracy.

In the practice of this invention, care is taken in manufacturing the load sensitive beams 40, with load sensors gages 50 attached, to cause the beams to be as identical as possible. Care is also taken to conform as closely as possible to a stringent specification. This control of manufacture of the beams allows for precalibration of the scales and their individual units prior to sending them into service. This precalibration makes it possible for scale units 20A–D, and load sensitive beam assemblies 40 within scale units, to be replaced and interchanged in the field with minimum effect upon overall scale sensitivity, accuracy and calibration.

The scale is readily portable and readily installed on a conventional hospital or other bed frame. The scale does not care with what kind of mattress it is used. When in place on a bed frame, it is unobtrusive. It can be interrogated, as described below, at any time for an accurate measurement of the weight of a person in the bed.

Preferably the truss-like platforms 21 of scale system 10 are powder coated for durability. The durable powder coating is preferably a substantially high visibility color, for example, orange. This provides medical staff with the ability to identify more easily those beds that have a scale installed and those that do not. This allows medical personnel to easily locate the scale if it is desired to move it or to allocate that bed to a specific patient. While the brightly colored and durable powder coating is currently preferred, the platforms can be left unpainted, or painted or coated with any color or colors, as functionally or aesthetically desired.

In order to further immobilize the rubber feet 35 of the current invention, when they are engaged with a bed frame, a self-adhering attachment apparatus 38 is used as shown in FIG. 9A and 9B. The attachment apparatus 38 is comprised of a shallow block 36. The shallow block 36 is attached to the bed frame 14C, for example, by means of an adhesive 37, in association with each scale unit foot 35. Each block is comprised of a relatively thick layer, as compared to the adhesive layer, of stiff material, such as a semi-resilient plastic. However, the stiff material 36 can be made of metal, composites, or other material as desired.

Each block 36 is recessed, as at 39, along one of its edges as shown in FIG. 9A. The blocks associated with the scale unit feet at each end of the scale unit are applied to the top surface of the adjacent bed frame section. Preferably, the blocks are applied such that the recesses of the block, located on the same side of the bed, face in opposite directions along the bed frame section, and so that the notches provide laterally open receptacles for the respective scale unit feet. The scale unit is placed on the bed frame so that its feet 35 engage the frame. The blocks cooperate to constrain and confine the feet from moving laterally or longitudinally of the frame. A minimum of two blocks per scale unit can be used in cooperation with each scale unit of the scale system, with one block being opposite the other in the width sense of the bed. If desired, one block for each scale foot can be used.

It is preferred that the adhesive 37 used to affix the blocks 36 to a bed frame be of a semi-permanent character. The semi-permanent adhesive is preferred so that the blocks can be removed from the bed frame sections. This removability is provided so that if the scale is removed from the bed, e.g., for use in a different bed, the bed may be removed from service with the scale, if desired. The blocks are also removable so that the scale can be position adjusted on the same bed frame with new blocks, if desired.

It may be desired to use scale 10, for example, in a health care facility having several beds, with the scale being movable from time to time from one bed to another. Each bed, or selected beds, in the facility can be made ready to receive the scale before actual use of the scale in the bed. Making the beds ready for a scale is accomplished by applying an appropriate number of blocks 36 to each bed at the proper places and in the proper relative orientations. The blocks are unobtrusive and do not interfere with normal use of a bed, even when no scale is in the bed. By replacement of blocks 36 on a number of beds, scale 10 can be moved from one of those beds to any of the other beds and placed quickly into patient-weighing use.

The flexible electrical circuitry 101 that interconnects the scale units is shown in FIG. 2. For each load sensitive beam 40 there are two wire cabling sets 101, i.e. wire harnesses, emanating from the load sensitive beam 40. Each wire cabling set is a part of the scales unit's six wire circuit, as described above, that is interconnected with the scale sensors as shown in FIG. 4A. A first wire cabling has a male connector 102 and a second wire cabling has a female connector 103. By providing both a male and female connection on each load sensitive beam 40, the load sensitive beam is not orientation specific.

To connect the scale units 20A–D, the male wire cabling connector 102 is either connected to the corresponding female wire cabling connector of the other load sensitive beam that is attached to the same scale unit, or to the corresponding female connector of the nearest adjoining load sensitive beam of another scale unit. For example, male connector 102 may be connected to the corresponding female connector emanating from the load sensitive beam attached to the edge of the scale unit 20D that is adjacent the illustrated scale unit 20C.

In the preferred arrangement, one male and one female connector are preconnected within each scale unit. This preconnection consists of identifying a male connector from one beam, and a female connector from the other beam of the same scale unit. These two connectors are then preconnected to each other. By this preconnection, there need only be one connection made for each additional scale unit that is used to form the scale system that is installed in a bed. For example, if one scale unit is used alone in a bed, the unit is merely connected to the control and display module, requiring only one connection. However, if multiple scale units are used, then the number of connections need only be one for the control and display module to either the "head" or "foot" scale unit, plus one connection between each scale unit that is used in addition to the first unit. Therefore, the total connections required to be completed for installation of a scale system will equal the number of scale units used in a bed.

In the presently preferred arrangement, after the scale has been preconnected, only four connections need be made to install the scale in a bed. These four bed-installation connections consist of three connections between the four scale units and a connection between the control and display module 170 and either the relatively "head" 20A or the "foot" 20D scale unit. In the current arrangement, the connector remaining at the "head" or "foot" scale unit to be used for the control and display module is preferably a male connector. It will be understood that the remaining unused connector that is not connected to the control and display module will remain open and unconnected. This unused connector will be at the relative "head" or "foot" end location that is opposite the end of the bed at which the control and display module is connected to the scale system. While only four connections are required to install the scale system into the bed, due to preconnection, it will also be understood that the connections, including the preconnections, will total eight serial connections. These serial connections are preferably from the control and display module to the relative "head" or "foot" scale unit, and then in a continuous line along the scale, such that each beam is connected to its adjacent beam along the length of the scale system.

To evaluate and process the signals from the scale units, the scale system also includes a control and display module 170 as shown in FIG. 11. This module has the attributes which are described below. The control and display module 170 of FIG. 11 has on its face 172 a control panel as shown in FIG. 12. The module is comprised of a housing 179 that has a projection 171 for removably mounting it on a bed frame. The module has a face 172, as shown in FIG. 12, that contains the functions available to the user when in USER mode. These functions are WEIGH, LBS./KG., HOLD, and ZERO. In addition to the USER mode, there are two other modes, named CALIBRATION and CONTINUOUS.

The control and display module 170 is battery operated. Preferably, 6 size AA alkaline batteries are used with the module. This provides approximately one year of use for weight interrogations before the batteries need to be replaced when the module is primarily used in USER mode. The module is a microprocessor-controlled, 24-bit resolution, four function tactile membrane keypad device when in USER mode. Preferably, the control and display module 170, without the holding projection 171, fits within an envelope of approximately three inches by seven inches by three inches.

The control and display module 170 performs background calibration to remove any electronic drift, and is digitally filtered. The module also provides for a six wire transducer connection to eliminate the effect of cable resistance variation. The software that is used in the central processing unit ("CPU") is preferably firmware or software that can be upgraded as desired by the manufacturer of the scale. The firmware is implemented in high-level C language that facilitates its ease of use and reduces its development costs for any future modifications and improvements to the software as desired by the users.

The overall construction of the control and display module is primarily of surface mount technology, electronic circuitry, and patented gate array design technology. This compact and reliable circuitry insures the long term accuracy and stability of the module and the scale system. The module is primarily a high precision transducer amplifier along with a microprocessor that performs the calibration and filtering procedures described above. In addition to the batteries that power the control and display module, a backup lithium battery is provided to store all system configuration parameters in nonvolatile RAM. Preferably, the firmware or software data will be able to be kept for approximately ten years, even if there is no power applied to the module from the batteries or other source, other than the lithium battery.

The module's four digit numerical liquid crystal display ("LCD") 180 has a display range from −99.9 to 999.9 when the WEIGH function is used. Once the medical staff has obtained the weight, the control and display module will automatically shut off, if there is no keypad activity for approximately ten to fifteen seconds. If any key is pressed while the weight is being displayed, the automatic unit shut off period will automatically be extended for another ten to fifteen seconds, approximately.

The keypad with the four keys is a static control tactile feed back membrane switch keypad. While the keys are usually used for the functions as labeled in FIG. 12, they can also be used for other special purposes such as when the module is placed in CALIBRATION mode.

When in USER mode, the module will automatically check itself, including the functionality of the input stage, during each power up sequence. If a circuit malfunction is detected, the module will display an error or warning code and then shut itself down.

The four keypad USER mode functions are WEIGH, LBS./KG., HOLD, and ZERO. A lbs./kg. light emitting diode ("LED") 177 is provided to signal the user whether pounds or kilograms is being displayed. The LED is turned on, causing it to emit light, when pound units are displayed, and is turned off when kilogram units are displayed. In addition, a low battery LED 178 is turned on to provide a signal to the user when batteries are in need of replacement. Preferably, the weight and other data are displayed on a four digit liquid crystal display 180, which is located just above the keypad, on the control panel face 172.

In order to obtain a patient's weight, the bed is first moved into a completely flat position. Next, the scale operator, i.e. a medical staff person, presses the WEIGH key 173 to power up the module and take an initial weight reading. In actually weighing the patient, after the WEIGH key 173 is pressed the first time, it must actually be pressed a second time in order to update the weight on display from the previous weight taken. Either pound or kilogram units may be read. The scale operator presses the LBS./KG. key 175 to alternate between the two measurement systems, if desired. The weight is recorded and the weighing process is complete. The module will automatically shut off.

In addition, the scale operator can press the HOLD button if it is desired to add or remove items from the bed. In the USER mode, as described above, the HOLD key 174 is pressed when weight is desired to be added or subtracted from the mattress, such as a pillow, a blanket, and the like. The HOLD key is a special tare, i.e. zero, function key that allows for changes in the initial zero weight setting without effecting the patient's weight reading. This holds the patient's weight in memory, and automatically subtracts or adds the weight that is removed or added. When the module is in the HOLD mode the LCD 180 reads "hold." Normally, the HOLD key is pressed again to release the module from the HOLD state, once the items have been removed or have been added to the bed. Also, the HOLD function will automatically release after approximately ten minutes if the HOLD key is not pressed to release it manually. The patient's true and accurate weight will still be displayed after the HOLD key is released and the objects have been placed upon or removed from the bed while the HOLD key was locked.

The ZERO key 176 is used to zero the scale to 0 pounds when no patient is residing on the mattress. This ZERO function is primarily used when the scale is initially set up, prior to use by the patient. The ZERO key 176 is a regular tare or zero function key. It is used to tare out any weight on the scale before weighing the patient. For example, this zeros out the scale with the mattress and blankets that are provided before the patient is placed upon the bed. By pressing the ZERO key 176 once, the LCD display will show the "-0-" string. In order to prevent the mistake of pressing the ZERO button accidentally, the user needs to continue to press the ZERO button for at least five seconds to confirm the zeroing operation. During this time, the display will continue to show the "-0-" string. If the ZERO key is released too soon, the zeroing function will cancel and the display will return to its original reading. However, if the ZERO key is held for the proper length of time, the "-0-" string will begin flashing to indicate the function has taken place. The ZERO key should then be released and "0.0" will show on the display. The weight should be close to zero after the zeroing operation.

The control and display module has three modes of operation. The first mode is described above as the USER mode. The other two are the CALIBRATION mode and the CONTINUOUS mode.

The CALIBRATION mode is primarily intended for use by scale technicians and service personnel to adjust the scale's performance. The CALIBRATION mode is used by the service personnel for calibrating and adjusting the control and display module. As described above, the USER mode is used by the typical users to operate the scale for weighing. To jump between the these two modes, a mode selection switch is located inside the module 170.

When the system is placed in CONTINUOUS mode by operation of the internal mode selection switch, the display continuously displays the patient's weight.

The control and display module 170 can be used as either a hand held device, or can be removably mounted, for example, on the bed frame using a clamping device. FIG. 11 shows a side view of a control and display module 170 that is "hinged" at 151 to a clamping bracket 150. To mount the module 170 upon the bracket 150, the module projection 171 is placed between, and then passed through, the hinge points 151 of the bracket 150. The module housing 179 and the clamping bracket are preferably constructed of a polycarbonate material. The module may be rotated about the hinge points 151 to more easily enable the medical personnel to read the display. Additionally, the module may be easily removed from the bracket by sliding it upwards. This allows medical personnel to operate the module without having to leave it on its bracket hinge points.

The module bracket 150 is removably attached to the bed frame head board, foot board, or other appropriate mounting area by clamping the bracket 150 to the mounting surface. The bracket is able to maintain its position by first loosening the knob 154 and sliding the clamp 153 until the mounting surface is forcibly caught between the clamping surface 156 and the bracket surface 155. The knob 154 is then rotated to tighten the clamp.

While the presently preferred scale 10 is comprised of four load receiver units, there are other forms in which a scale system according to this invention can be arranged. One alternate arrangement is to construct the scale load assembly of one large load receiver unit that covers the entire length of the bed. This could be used, for example, with a more conventional bed frame that does not articulate. The load sensing beams can be placed with their orientation either similar to or perpendicular to the orientation (cross-bed) used in the system shown in FIGS. 1 and 2 of the present arrangement. If the beams are oriented similarly to the preferred arrangement, then the load sensing beam ends terminate along the opposite sides of the bed. Alternately, the load sensing beams can run perpendicular, i.e. from the "head" to the "foot" of the bed, if merely one large scale load receiver unit is used. If more than one scale unit is used in a bed, each with this perpendicular beam arrangement, then the orientation of the load sensing beams can be oriented relatively "head" to "foot" on each scale unit. While a scale system with four load receiver units is the preferred arrangement, it will be understood that a lesser number as well as a greater number of scale units could be used, as desired.

In the presently preferred arrangement, each scale unit 20 A-D is comprised of a substantially rigid structure 25 with lightening holes that form a substantially "grid-like" geometric pattern. This patterned structure provides relatively high strength with low mass as compared to using a metal structure with a solid, i.e., non "grid-like" pattern. While the current patterned structure is preferred, other arrangements, such as the solid structure mentioned below, are possible. The units can also be constructed with lightening holes that do not form any particular geometric pattern. Also, while in the preferred arrangement the platforms 21 are constructed of aluminum, the platforms can be constructed of stainless steel, synthetic materials, or composites. Examples include, but are not limited to, constructing the platforms either partially or totally of carbon graphite or fiberglass materials as well as metal, metal matrix or ceramic materials and the like.

In another alternate arrangement of the platforms, a combination of aluminum and honeycomb structure may be used. Preferably the honeycomb is sandwiched between one or more sheets of aluminum that provides a relatively high strength-to-weight ratio. However, in the current invention, it is preferable to sandcast the aluminum truss-like platform. While sandcasting is presently preferred, other ways of forming the aluminum platforms include diecasting, machining, and the like.

While in the preferred arrangement the platform is desired to be substantially rigid, by using the one large platform that is substantially the same size as the bed frame as described above, less rigidity is allowable. For example, this can be accomplished by putting more of the load cell sensors along the edges of the platform. The several load sensors, i.e., load sensitive beams, can be placed along the platform edges. This requires less overall rigidity of the one large platform than would be required if merely four sensors are employed, one at each corner of the large single bed-sized platform.

Further, the beams can be oriented perpendicular to the current preferred arrangement along the length of the scale units. If one scale unit is used, the beams can all be of the same length. If more than one scale unit is desired, but the units are substantially uniform in length, as in "head" to "foot", then a standardized load sensitive beam can be used in the mounting that is perpendicular relative to the preferred arrangement where the length of a beam is oriented at a right angle across the line formed from the "head" to the "foot" of the bed.

As described above, platforms of varying length, as in from "head" to "foot" of the bed, are preferable. The beams can be oriented along a line that is formed from the "head" to the "foot" of the bed, even though the scale units are of varying length. However, in that arrangement, the load sensitive beams may be required to be of varying length, with each beam length adapted to its particular scale unit length. Instead, in the presently preferred form of the invention, by mounting the load sensitive beams as shown in FIG. 2, all load sensitive beams for all platforms can be made of the same standardized length. This makes every load sensitive beam fully interchangeable on any platform of any bed scale of that style.

The scale system 70 of FIG. 7 includes a load sensitive beam 72 that is attached to the load bearing platform 74 by screws 71. The load sensitive beam 72 has a portion 77 that is rigidly attached to the platform structure 74 by screws 71 or the like. A load sensor 73 is placed suitably on a relatively flexible portion 78 of the load sensitive beam which is unconnected to and deflectable relative to the platform. The sensor 73 is placed between the screws 71 and a dowel pin 75 which passes through the center of the beam end 79. The dowel pin is attached on both ends to the walls of a channel 76 that is parallel to the beam and spans the space between the opposite sides of a bed frame. The beam is mounted and centered within the walls of this channel. Other than for the dowel pin, the relatively flexible portion 78 of the beam is not supported between the screws 71 and the end of the beam which is substantially collocated with the dowel pin.

Functionally, the load bearing platform 72 of scale system 70 supports the patient's weight. The platform is carried via the load sensitive beams by the channels 76. The ends of the channels are supported on the bed frame members 60 by feet carried by the channel at its end. The load is thus transmitted through the beam flexure zones 78. The sensors 73 detect the amount of beam deflection in each flexure zone caused by the transmitted load. The dowel pin arrangement allows for relatively accurate measurement of that deflection. This accurate measurement occurs because substantially all side loads are excluded, and only the top loading of the patient on the scale is measured. The control and display module then converts the sensor measurements into a measurement of weight.

Each beam 72 shown in FIG. 7 is supported in a manner approximating, and functionally equivalent to the simply supported beam 125 shown in FIG. 3B. Each beam 72 is supported at its dowel pin end 79 in a manner which corresponds to the way beam 125 is supported at its respective ends 126 by the simple end supports 121. Beam 125 has a relatively large central cross-sectional area 123 that is transverse to the beam. This central cross-sectional area that is an analogy to the portion of beam 72 which is affixed to platform 74. The relatively small cross-sectional area portion 124 adjacent the ends of beam 125 is an analogy to end portions 78 of beam 72. A force 122, representing the mass of the object to be weighed by the scale 10 as shown in FIG. 1, is applied as shown in FIG. 3B to the top surface 127 of the representational beam. The force 122 is the functional equivalent of the patient to be weighed by scale system 70. The relatively large beam cross-section 123 substantially transmits, without significant flexing, the applied force 122 to the relatively small beam cross-section 124 where flexure of the beam occurs.

There are other load sensitive beam arrangements that are functional equivalents but physical variants from the preferred beam arrangement described above. Such variants include those in which material is removed from the cross-section of a load sensitive beam in the vicinity of the sensing device. For example, in the preferred arrangement as shown in FIG. 2, material is removed, or drilled out, from the vicinity of the beam neutral axis between its top and bottom surfaces, thus to provide the zone of reduced cross-section 44. If desired, one may instead remove material from the external surfaces of the beam to impart to the beam a wasp-waist type of configuration. Other arrangement techniques can be used to concentrate beam stresses in the area of a load sensor so that a highly accurate reading of the patient's weight may be obtained.

As shown in FIG. 5, another scale system 91 according to this invention includes plural load receivers each comprised of a truss-like lightened platform core 95 having a cover 94. The core 95 can be the same material as the cover 94, or of different materials. The cover and core can be comprised of aluminum, or of a different material such as any of the materials mentioned above for scale units. The platform can be machined out of a solid block of aluminum so that the core and cover are integrally connected. Another example includes constructing the cover out of fiberglass with the truss-like core made of aluminum, and then suitably bonded to each other.

FIG. 5 also shows that, where a load assembly is comprised of plural load receiver platforms, they can be hinged to each other. When hinged, the scale load receiver units can be folded and carried as a set. The bidirectional hinges 92, depending upon the attachment to the bed frame that is chosen, can facilitate the scale in remaining properly situated upon the bed frame. By having one or more units hinged together with a flexible type hinge as is known in the art, the electrical cabling need not be disconnected and reconnected between the hinged units each time the scale is moved from bed to bed.

As shown in FIG. 5, the hinged units can be latched together via the latch 93 for transport. The arrangement can either have two units which are hinged together, but are separate from the remaining two units which are also hinged to each other, or all four units can be hinged together if desired. When the respective hinged units are folded together, the latch 93 is used to keep the units folded until ready for installation again.

FIG. 5 also shows another form of load sensitive beam system 80, an enlarged view of which is shown in FIG. 6. A channel or other suitable arrangement is formed during manufacture of the platform core and cover, such that the beam system can be mounted in a recessed manner as shown in FIG. 6.

Beam system 80 includes a beam member 82 having an end 88B which is rigidly attached by screws 81 to the truss-like platform core 95 as well as to the cover structure 94. The beam's other end 88A is rigidly attached to a mounting strapping plate 85 structure via screws 84. The strapping plate carries suitable straps or the like by which the plate can be buckled or otherwise securely affixed to the surface of a respective bed frame section. A load sensor 83 is suitably mounted to the load sensitive beam 82 near the center of the beam, which is collocated with the flexible beam portion 87. The strapping plate includes a cut out portion 86 which allows clearance for the beam end 88B to flex into this cut-out region. Similarly, the beam end 88A is allowed to traverse into a cut-out region 89 that is provided above that beam end in core 95.

This modular load sensitive beam 80 is structurally different from the presently preferred beam arrangement and is functionally represented by FIG. 3C. Load sensitive beam 80 does not extend across the width of the bed. Instead, the beam is located along an edge of the scale load assembly. A plurality of beams 80 are placed along the perimeter, i.e. along each side of the load assembly.

Functionally, each beam 80 is supported at its ends in a manner approximating the end supports of beam 135 as shown in FIG. 3C. FIG. 3C shows a supported representational beam 135 that is the functional equivalent of the beam 80 as shown in FIG. 6. The beam 135 is supported at its bed frame end 134 by the fixed support 137. The platform end 133 of the beam is attached to the support 138. The beam has a center portion 136 which is relatively flexible. A force 132, representing the mass of the object to be weighed by the scale is applied to the top surface 131 of the support 138. The force 132 is the functional equivalent of the patient to be weighed by the current invention. The fixed ends 133, 134 of the beam cause the force to be transmitted to the beam's central flexible portion 136, causing stress deformation of the center of the beam. Suitably mounted sensors are collocated in the vicinity of the center of the beam to sense the deformation of the center of the beam. The strain measurement is then converted by a control and display module 170, as shown in FIG. 11-12 and described below, into a representation of weight.

Another scale system 190 of this invention is shown in FIGS. 13 and 14. In this arrangement, the scale is actually a part of a mattress assembly. The scale is inserted into pockets 193 located in the bottom of a mattress cover 192, the pockets being closable via zippers 191. The scale then becomes a part of the mattress, forming a mattress/scale set 190. A mattress of suitable kind rests upon the top of the scale, inside the mattress cover. Pockets 193 are provided to allow the mattress more flexibility in the flexure regions 194 when the mattress is used on an articulated bed. A center zipper 195 provides for assembly and disassembly of the mattress and scale units, so that it can be divided in half, allowing for easier carrying of the scale by the personnel moving it. Suitable clearance holes can be provided, if desired, to allow the scale feet to protrude, for example. Alternately, the entire mattress can be strapped onto the bed frame sections, or any other attachment apparatus may be used to hold the mattress/scale set in place. Other arrangements include having the mattress be collocated upon the scale in a pocketless mattress cover.

Several means of attachment can be used to cause the scale to be properly positioned on a bed frame. One such arrangement consists of attachment latches that, for example, are rotatably mounted on a scale unit; such latches can be similar to latches 93 shown in FIG. 5. Each latch can cooperate with a hook, pin or the like that is installed on the bed frame.

Another mechanism effective to cause the scale load receiver units to stay in place on a bed frame is to provide rubber feet similar to the rubber feet shown in FIG. 2, but modified to include a mounting post within the rubber foot. The post can extend through the bottom of the foot and into a hole in the bed frame. This provides that the scale is supported by the rubber foot cushions but is immobilized from lateral movement by the posts. By providing this rubber cushion, the likelihood of damage to the scale is reduced. Without providing some resilient cushioning, the scale can possibly be damaged if someone, for example, a heavy person, jumps on the bed or otherwise causes a significant impact loading to the scale. Other causes of impact loading can include performing vigorous cardiopulmonary resuscitation ("CPR"). In order to help prevent damage from impact loading, the scale preferably is constructed with support feet that are made of a resilient rubber.

Another method of mounting the scale load receiver unit on a bed frame is by using angle brackets, or the like, in place of the rubber feet. FIG. 8A shows a bracket-type support device 63 that functions to resist sliding of the scale unit off of the bed. An angle-type bracket 63 is placed upon the bed frame section 64. Movement of the scale unit is restricted by using at least two brackets for each scale unit, one on each of the opposite sides of the bed.

FIG. 8B shows another mechanism for mounting a load assembly to resist sliding of the scale off of the bed frame. FIG. 8B shows a clamping-type support device 65 that functions to cause the scale load receiver units to be more rigidly affixed to the underlying bed frame structure 67. A thumb screw 66 is threadably engaged with the device 65. The device operates to cooperate with a bottom surface of a bed frame rail to clamp a scale support post 68 to the rail.

Figure 15:
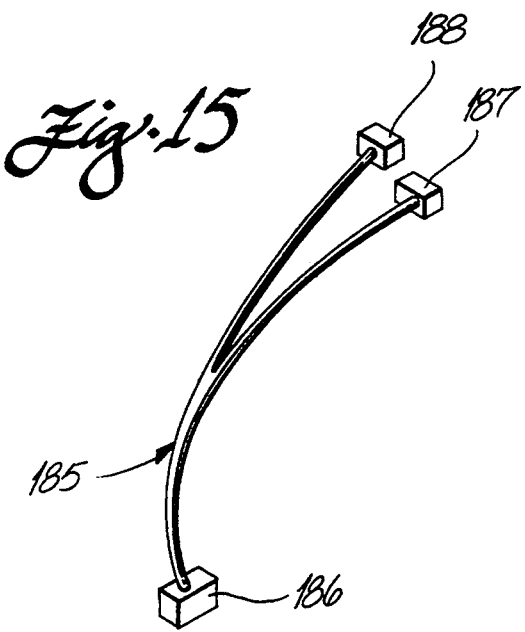
FIG. 15 is a view of an auxiliary electrical cable useful to interconnect a scale load assembly and a scale control and display module.

As noted above, the presently preferred scale 10 has two connectors on each beam, one male and one female. As previously described, this male and female connector arrangement allows for the present scale arrangement to be used without need for any other external cabling in order for the several scale load receivers to be connected to each other and to the control and display unit. However, if enhanced weighing accuracy is desired, then an additional auxiliary cable, as shown in FIG. 15, can be used. The auxiliary bus cable 185 has preferably three connectors 186, 187, 188. Connector 186 is connected to the "foot" scale unit's unused connector. Connector 187 is connected to the "head" scale unit's unused connector. Finally, connector 188 is connected to the control and display module. By using this external auxiliary bus cable 185, the scale's measurement accuracy can be enhanced.

Alternate wiring arrangements of the scale system include eight connection version comprised of one cable emanating from each load sensitive beam and connectable to a bus cable extending along the scale load assembly to the control and display module. Modular phone jack connectors can be used, as opposed to the commonly available DIN type male and female connectors used in the eight connection scale system described above. Any connector style which does not interfere with the operation of the scale can be used. It is preferred that a connector's width or height not exceed the clearance height of a scale unit. The clearance height of the scale unit is the smallest distance measured from the top of the bed frame on which the scale unit is mounted, to the bottom of the scale unit's truss-like platform, load sensitive beam, or other load supporting structure to which the load sensitive beam is attached. By having connectors that exceed the clearance height of the scale unit, the transmission of the applied load through a beam and its load sensors onto the scale feet can be interrupted. Such interruption may cause the connector to support some or all of the load applied to the adjacent load receiver unit, thereby by-passing one or more load sensors and producing a weight measurement error.

The present invention provides a reliable, low cost, and retrofittable in-bed scale system which can work with any conventional mattress. The scale also can work with the mattress described in PCT International Publication No. WO 92/07541 and most other fluid mattresses. Other mattresses include, but are not limited to, low air loss and air flow mattresses, for example.

The total weight of the presently preferred scale system is approximately 45 pounds, with an overall height of approximately 1¼ inch. The preferred scale system consists of four individual load receiver panels that are separately placed on the bed frame to allow for bed articulation. The connections between panels, and to the readout unit, are made via flexible wiring cabling. The approximate calibrated distributed load capacity of the scale is between 0 and 600 pounds (272 kilograms), with a sensitivity of approximately one-tenth pound, and an overall system accuracy of approximately one-half pound. However, the scale can weigh or support subjects up to approximately 1,200 pounds without damage to the scale.

A scale according to the present invention is not "built-in" to the bed frame. Therefore, it avoids requiring the user to purchase an entire new unique bed just to have a scale that is usable while the patient lies in the bed. The in-bed scale is easy to transport from bed to bed and does not need re-calibration each time it is moved from bed to bed. The scale system does not require any specially trained personnel to install or set up the scale when moved from bed to bed or when placed on a bed for the first time. To install the scale system, is load assembly is first placed between the mattress and the bed frame. Then approximately four electrical connections are made by merely plugging together standard type connectors. This electrically connects the scale units to each other and to the control and display module.

To measure a patient's weight, health care personnel merely examine the readout unit after first pressing a button to cause the unit to display the patient's weight. Medical personnel can then record the weight on the patient's chart or use the information as required. The present scale system avoids the problems of other types of scales that often take many minutes, and a great deal of effort, to move the patient or to cause the patient to get up and cooperate to have his/her weight measured. Instead, with the present scale system, the only intrusion to the patient, if any, is that it is preferable to put the patient's bed in a nonarticulated state prior to reading the weight. Upon reading the weight, the bed can be re-articulated to the patient's comfort, as desired. This entire operation takes significantly less time than the traditional methods of weighing a patient. This also causes little or no patient discomfort nor does it cause any significant disturbance of the patient.

By using the present invention, medical personnel will not be required to physically move a patient, either manually or with a stretcher or hammock, for example. Moving the patient can be extremely difficult, as the patient may be critically ill. Also, it is often required that more than one medical staff member be available to move a patient, as usually a patient weighs more than one person can lift. With the present invention, only one person is required and need not lift or move the patient. This prevents injury both to the patient and to the medical personnel. The present scale is able to determine a patient's weight within the range that is likely to change due to nutritional tissue gains and losses, as opposed to weight charges that reflect changes in total body water. This provides the medical staff with the ability to monitor a patient's weight and to modify therapeutic treatment based upon the weight measurement, if desired.

The scale is very, reliable and has no mechanical moving parts, unlike most other scales.

Because the present scale is located between the bed frame and the mattress, the patient's weight is constantly available at any time the patient is in the bed. Even when the scale is in use, the patient remains relatively undisturbed and the bed remains mobile and ready for movement.

Workers skilled in the art to which this invention pertains will understand that the foregoing description of the presently preferred and other structural and procedural aspect of the invention has been presented for purposes of illustration and example, and that such description is not an exhaustive catalog of all of the ways in which the invention can be embodied or practiced. Those workers will understand that variations and modifications of the described structures and procedures can be made while using the principles and advances of the invention and without departing from the fair scope of the invention as set forth in the following claims.

What is claimed is:

1. A scale system for measuring the weight of a person supported on a bed frame which can have plural articulatable sections, the scale system comprising:

(a) a load assembly mountable on a bed frame and having length and width dimensions related to length and width dimensions of the frame, the load assembly comprising plural planar and substantially rigid load receivers which are sized for accommodation of bed frame articulation, the load assembly having a height dimension which is small relative to its width and length dimensions whereby the presence of the load assembly in association with a mattress on the bed frame does not appreciably raise the mattress above the frame, (b) a plurality of load sensors disposed at selected locations in the load assembly each having an output signal representative of the load carried by the assembly in the vicinity of the sensor, and (c) a system output device operable for receiving the several sensor output signals and for producing a system output signal which is representative of the total load carried by the load assembly.

2. A scale as defined in claim 1 including means for releasably mounting the load assembly to the bed frame.

3. A scale as defined in claim 2 wherein the mounting means includes a means for resiliently supporting the load assembly on the bed frame.

4. A scale as defined in claim 1 wherein the to load assembly includes a beam rigidly attached to each load receiver at selected locations along the beam, and means effectively coupling the beam to the bed frame.

5. A scale as defined in claim 4 wherein a load sensor is associated with each other beam location.

6. A scale as defined in claim 4 including the mounting means arranged for releasably connecting the load receivers to the bed frame.

7. A scale as defined in claim 4 including a plurality of load bearing feet depending from the load receivers at locations selected for engagement of the several feet on the bed frame upon placement of the load receivers upon the frame, and a plurality of feet retainers affixable to the frame adjacent the places of engagement of the feet with the frame for securing the feet from lateral movement relative to the frame.

8. A scale as defined in claim 7 wherein the feet retainers are adapted for adhesive attachment to the bed frame.

9. A scale according to claim 1 wherein each load receiver has a substantially rectangular platform configuration, there being a beam end adjacent each corner of each load receiver via which the receiver is mountable on a bed frame, and a load sensor disposed proximate each receiver corner adjacent the corresponding beam end.

10. A scale according to claim 9 wherein, adjacent each said beam end, a beam has a flexure zone of reduced cross-sectional area, and the corresponding load sensor comprises a strain gage coupled to the beam flexure zone.

11. A scale according to claim 10 wherein each strain gage comprises at least one strain-sensitive variable resistor, a plurality of the resistors associated with each load receiver being interconnected to define a bridge circuit.

12. A scale according to claim 10 wherein each load receiver comprises a pair of beams disposed substantially parallel to each other adjacent respective opposite edges of the receiver, whereby there is a beam end adjacent each corner of the receiver, each beam being securely affixed to the receiver along a central portion of its length and having opposite end portions which are unconnected to the receiver to deflect under load as cantilever beams, the beam end portions comprising components of corresponding load sensors which further include a strain gage coupled to each beam end portion.

13. A scale according to claim 12 wherein each strain gage defines a pair of strain sensitive resistors.

14. A scale according to claim 13 wherein the strain gages associated with each beam are interconnected so that the several resistors thereof cooperate as a variable resistance.

15. A scale according to claim 14 wherein each beam and strain gage combination in the load assembly is substantially identical to each other such combination in terms of its sensitivity to load, the no-load value of the variable resistance, and the change in resistance as a function of load.

16. A scale system for measuring the weight of a person supported on a bed frame which can have plural articulatable sections, the scale system comprising:

(a) A load assembly mountable on a bed frame and having length and width dimensions related to length and width dimensions of the frame, the load assembly comprising plural planar and substantially rigid load receivers which are sized for accommodation of bed frame articulation, the load assembly having a height dimension which is small relative to its width and length dimensions whereby the presence of the load assembly in association with a mattress on the bed frame does not appreciably raise the mattress above the frame, b) a plurality of load sensors disposed at selected locations in the load assembly adjacent each longitudinal edge of the load assembly in an array in which the sensors are disposed in pairs with each sensor adjacent one edge being opposite a corresponding sensor adjacent the opposite load assembly edge, each having an output signal representative of the load carried by the assembly in the vicinity of the sensor, and c) a system output device operable for receiving the several sensor output signals and for producing a system output signal which is representative of the total load carried by the load assembly.

17. A scale according to claim 16 including a beam associated with each pair of sensors, each beam being secured along a central portion of its length to the adjacent load receiver, being unsecured to the load receiver along opposite end portions thereof, a load sensor coupled to each beam end portion, and means for mounting the load assembly to a bed frame via the ends of each beam, whereby upon placement of the load assembly on a bed frame and upon application of a load to the load assembly the beams can deflect in the end portions thereof.

18. A scale according to claim 17 wherein each beam end portion defines a flexure zone in which the beam is of reduced cross-sectional area, and the load sensors comprise strain gages coupled to the beams in the flexure zones thereof.

19. A scale according to claim 18 wherein each beam and load sensor combination is substantially identical to each other such combination in terms of its sensitivity to load and its no-load characteristics.

20. A scale according to claim 18 wherein each strain gage defines a pair of strain sensitive resistors, the resistors associated with each beam being interconnected to respond as a single strain sensitive variable resistance to load applied to the load assembly.

21. A scale according to claim 16 including a control and display module operable for displaying in selected units of measure the magnitude of a load carried by the load assembly.

* * * * *